US010432472B1

(12) United States Patent
Douberley et al.

(10) Patent No.: US 10,432,472 B1
(45) Date of Patent: Oct. 1, 2019

(54) NETWORK OPERATION CENTER (NOC) TOOL PATTERN DETECTION AND TRIGGER TO REAL-TIME MONITORING OPERATION MODE

(71) Applicant: Sprint Communications Company L.P., Overland Park, KS (US)

(72) Inventors: David N. Douberley, Orlando, FL (US); Bryson Earl, Altamonte Springs, FL (US); Justin L. Ford, Orlando, FL (US); Matthew D. Kurtz, Altamonte Springs, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 321 days.

(21) Appl. No.: 15/259,018

(22) Filed: Sep. 7, 2016

(51) Int. Cl.
*H04L 12/24* (2006.01)
*H04L 12/26* (2006.01)

(52) U.S. Cl.
CPC ............. *H04L 41/12* (2013.01); *H04L 43/10* (2013.01); *H04L 41/06* (2013.01); *H04L 43/04* (2013.01)

(58) Field of Classification Search
CPC ......... H04L 41/12; H04L 43/10; H04L 41/06; H04L 43/04
USPC ........................................................ 709/224
See application file for complete search history.

(56) References Cited

U.S. PATENT DOCUMENTS

| | | | | |
|---|---|---|---|---|
| 6,640,101 B1 * | 10/2003 | Daniel | ................. | H04Q 3/0087 455/423 |
| 7,236,767 B1 * | 6/2007 | Cankaya | ................ | H04W 24/08 455/405 |
| 7,395,053 B1 * | 7/2008 | Mak | ........................ | H04M 3/22 455/414.1 |
| 2004/0121742 A1 * | 6/2004 | Abrams | ................ | H04B 1/0466 455/115.1 |
| 2009/0006010 A1 * | 1/2009 | Van Sloun | ............ | G01R 31/389 702/57 |
| 2009/0075663 A1 * | 3/2009 | Wilson | ..................... | H04L 41/22 455/446 |
| 2010/0228854 A1 * | 9/2010 | Morrison | ................ | H04L 29/00 709/224 |

(Continued)

OTHER PUBLICATIONS

Bryson, Earl, et al., "Universal Database Import Platform," filed Oct. 6, 2015, U.S. Appl. No. 14/876,732.

(Continued)

*Primary Examiner* — Nicholas R Taylor
*Assistant Examiner* — Chong G Kim

(57) ABSTRACT

A mobile wireless communication network monitoring system. The system comprises at least one processor, a non-transitory memory, and an application stored in the non-transitory memory. When executed by the processor, the application periodically receives data from a plurality of cell sites and, in response to receiving data from one of the cell sites, examines a selection of data items of the data from the one of the cell sites. The application further, in response to one of the selected data items having a trigger value, initiates a real-time command and control process that iteratively pulls data from the cell site associated with the one of the selected data items having the trigger value and presents the data pulled from the cell site in a real-time monitoring window of an operator workstation, whereby an operator exercises timely control of the cell site.

17 Claims, 2 Drawing Sheets

(56) References Cited

U.S. PATENT DOCUMENTS

| | | | |
|---|---|---|---|
| 2013/0083664 A1* | 4/2013 | Harris | H04W 24/00 370/241 |
| 2014/0153418 A1* | 6/2014 | Hariharan | H04W 24/10 370/252 |
| 2016/0043814 A1* | 2/2016 | Bishop | H04W 24/00 370/242 |
| 2016/0269917 A1* | 9/2016 | Hillegas, Jr. | H04W 24/02 |
| 2016/0328945 A1* | 11/2016 | Greisser | F24F 11/30 |
| 2017/0048794 A1* | 2/2017 | Chakraborty | H04W 52/0203 |
| 2017/0213447 A1* | 7/2017 | Horrocks | G08B 19/00 |
| 2018/0054490 A1* | 2/2018 | Wadhwa | G06F 9/45558 |

OTHER PUBLICATIONS

Douberley, David N., et al., "Computer Platform to Collect, Marshal, and Normalize Communication Network Data for Use by a Network Operation Center (NOC) Management System," filed Oct. 23, 2015, U.S. Appl. No. 14/920,873.

Jadunandan, Kevin V., et al., "Communication Network Operations Management System and Method," filed Oct. 23, 2015, U.S. Appl. No. 14/920,874.

\* cited by examiner

NETWORK OPERATION CENTER (NOC) TOOL PATTERN DETECTION AND TRIGGER TO REAL-TIME MONITORING OPERATION MODE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cell sites that comprise cell towers have many components suitable for wireless communication. These components comprise routers, radio heads, antennas, and other components. Cell towers may have equipment suitable for implementing one or more wireless communication protocols including a code division multiple access (CDMA) wireless communication protocol, a global system for mobile communication (GSM) wireless communication protocol, a long term evolution (LTE) wireless communication protocol, a worldwide interoperability for microwave access (WiMAX) wireless communication protocol, and another protocol. Off-site monitoring, for example by a network operations center (NOC) or network management center, may monitor cell-sites and each of the components that function at the cell-sites.

SUMMARY

In an embodiment, a mobile wireless communication network monitoring system is disclosed. The system comprises at least one processor, a non-transitory memory, and an application stored in the non-transitory memory. When executed by the processor, the application periodically receives data from a plurality of cell sites and, in response to receiving data from one of the cell sites, examines a selection of data items of the data from the one of the cell sites. The application further, in response to one of the selected data items having a trigger value, initiates a real-time command and control process that iteratively pulls data from the cell site associated with the one of the selected data items having the trigger value and presents the data pulled from the cell site in a real-time monitoring window of an operator workstation, whereby an operator exercises timely control of the cell site.

In another embodiment, a mobile wireless communication network monitoring system is disclosed. The system comprises at least one processor, a non-transitory memory, and an application stored in the non-transitory memory. When executed by the processor, the application examines a selection of data received from a plurality of cell sites, where the data comprises sensor values and performance metrics that are periodically pushed by the cell sites to the monitoring system and where the selection of data that is examined comprises an open door sensor value. The application further, in response to determining that an open door sensor value is active, initiates a real-time process that iteratively pulls data from the cell site associated with the active open door sensor value and that presents the data pulled from the cell site associated with the active open door sensor value in a monitoring window of an operator in a network operations center (NOC) of the mobile wireless communication network, whereby timely monitoring of the cell site is promoted.

In yet another embodiment, a mobile wireless communication network monitoring system is disclosed. The system comprises at least one processor, a non-transitory memory, and an application stored in the non-transitory memory. When executed by the processor the application examines a selection of data received from a plurality of cell sites, where the data comprises sensor values and performance metrics that are periodically pushed by the cell sites to the monitoring system and where the selection of data that is examined comprises a voltage standing wave ratio (VSWR) sensor and, in response to determining that the VSWR sensor value is in alarm, initiates a real-time process that iteratively pulls data from the cell site associated with the alarmed VSWR sensor and that presents the data pulled from the cell site associated with the alarmed VSWR sensor in a monitoring window of an operator in a network operations center (NOC) of the mobile wireless communication network, whereby timely monitoring of the cell site is promoted.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
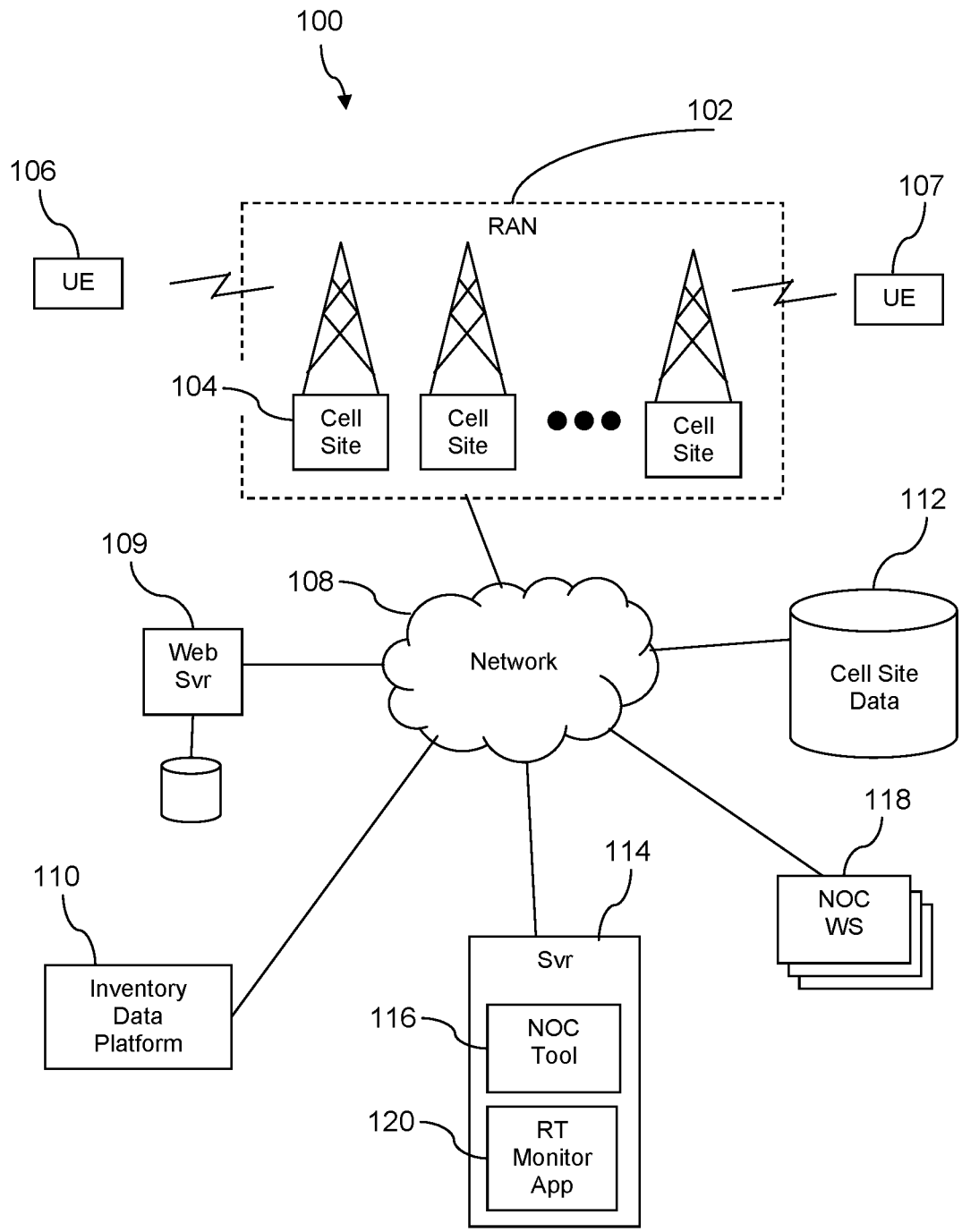
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Radio access networks (RANs) are complex systems. A RAN can be conceptualized as a thin outer shell of a communication network that provides wireless communication links to user equipments (UEs) or mobile communication devices and provides backhaul communication links to a fixed network comprised mostly of fiber optic lines, coaxial cables, copper wire, and electronic devices such as switches, gateways, and routers. A RAN comprises a large number of evolved node Bs (cell sites) base transceiver stations (BTSs), or cell towers, as well as auxiliary equipment that supports these cell sites such as Internet Protocol (IP) routers, IP aggregators, and the like. In some RANs, tens of thousands of cell sites are deployed.

Each cell site comprises a variety of different equipment items, and different original equipment manufacturers (OEMs) may provide the different equipment items. Different OEMs may provide different categories of equipment items. In some cases, a single category of equipment item in the RAN may be sourced from different OEMs. Different OEMs may provide their own tools for monitoring and managing the equipment items that they have sold to a mobile communication service provider for deploying in their RAN. These different tools may provide different abstractions and hierarchical views of the equipment items and different methods for monitoring and controlling the equipment items. Monitoring and managing the RAN can be a dauntingly complex and difficult task. And yet managing the RAN inefficiently can lead to customer dissatisfaction, a declining subscriber base, and diminished return on investment (ROI).

In an embodiment, data may be collected from network equipment elements in the RAN, processed, and stored in a data store. For further details about collecting data from network equipment in the RAN, see U.S. patent application Ser. No. 14/876,732, filed Oct. 6, 2015, and entitled "Universal Database Import Platform," by Bryson Earl, et al., which is hereby incorporated by reference herein in its entirety. In an embodiment, the data collected from the RAN and stored in the data store may be converted, normalized, and analyzed for consumption and/or use by a network operation center (NOC) tool that may be used by operators to monitor and control the RAN. For further details about preparing RAN data for consumption by a NOC tool, see U.S. patent application Ser. No. 14/920,873, filed Oct. 23, 2015, and entitled "Computer Platform to Collect, Marshal, and Normalize Communication Network Data for Use by a Network Operation Center (NOC) Management System," by David N. Douberly, et al, which is hereby incorporated by reference herein in its entirety. For further details about a network operations center (NOC) management system, see U.S. patent application Ser. No. 14/920,874, filed Oct. 23, 2015, entitled "Communication Network Operations Management System and Method," by Kevin V. Jadunandan, et al., which is hereby incorporated by reference herein in its entirety.

In some cases delays may occur between the initial collection of data from equipment items in the cell sites and in the RAN and the time when that data is percolated up to a NOC operator in a useful fashion. For example, in an embodiment, data may be collected from cell sites about every 15 minutes or about every 60 minutes and then that data would process through marshalling, normalizing, and analyzing processes before it is available in a NOC workstation display. Some operating conditions may be identified based on aggregating and/or averaging data over multiple collection intervals, introducing yet longer latency in identifying and acting on an undesirable condition in the RAN. Some conditions in a cell site may desirably trigger a heightened level of attention and more timely observance of information. The present disclosure teaches implementing monitoring processes that detect specific predefined conditions or parameter values or patterns of data in the initially collected raw data and trigger execution of real-time data monitoring on the cell site that is associated with the triggering data. This may further comprise identifying predefined patterns of data in combination with alarms generated by a NOC tool.

For example, sometimes thieves break into the electronic equipment shelter holding cell site electronics and other equipment items and steal expensive batteries. The present disclosure teaches executing a monitor that observes incoming raw data collected from the RAN and that examines a small selection of specific parameters or data items from each cell site. As an example, the monitor looks at the Door Open parameter. If the Door Open parameter is active (i.e., the door open sensor activates, indicating the door is open) for an cell site, the monitor then checks a maintenance data store or maintenance schedule to determine if on-site maintenance is scheduled at the cell site at the present time. If no corresponding maintenance is scheduled, the monitor launches a real-time monitoring window on a workstation display of a NOC operator, begins pulling data from the subject cell site continuously in near real-time, and presents the data on the workstation display. The data that is pulled from the subject cell site by the monitor may be a predefined subset of cell site parameter values or operating configurations associated with the triggering event (e.g., the Door Open active event). The predefined subset of cell site parameter values may be related to determining if the batteries at the cell site are sensed at zero voltage (i.e., batteries have been disconnected) or if other indications corroborate an on-going theft, such as battery voltage changes or a battery unplugged or disconnected parameter. If the NOC operator watching the display of the real-time monitoring determines a theft is in progress, he or she may call local police to report a crime in-progress. Alternatively, when one or more corroborative parameter values from the cell site are detected by the monitor process, the monitor process may automatically issue a crime in-progress report to local police.

In an embodiment, even when the maintenance schedule indicates maintenance is scheduled at the cell site that is associated with the Door Open parameter, the real-time monitoring window may be launched on a workstation display of the NOC operator. The NOC operator may examine the manifest of planned maintenance activities and watch a near real-time display of equipment status at the subject cell site. The NOC operator thus can back-stop the on-site technician and assure the planned maintenance is completed. In this way, if there is another issue that may have developed at the cell site, the NOC operator may have the on-site technician address the additional issue even though it may not be on the maintenance manifest, thereby opportunistically avoiding the cost of another trip to the cell site. By monitoring the cell site equipment status in near real-time rather than on 15 minute data collection intervals or even on 1 hour data collection intervals, the NOC operator may timely notify the on-site technician when corrections can most easily and promptly be made, rather than after the on-site technician has driven away from the cell site location.

It is contemplated that the monitor will be configured to handle a variety of special conditions and trigger to near real-time monitoring and/or automated response. The monitor may scan for a smoke sensor active indication (i.e., smoke is detected in an cell site) and automatically trigger to real-time monitoring of the subject cell site, presenting data on cell site operating parameters that may support interpreting the smoke sensor active indication such as a temperature inside the electronic equipment shelter, an electrical current load consumed by the cell site, or other parameters. The monitor may scan for an anomalous voltage standing wave ratio (VSWR) parameter indication and may trigger real-time monitoring of the subject cell site when the anomalous VSWR parameter is detected. In this case the monitor may begin monitoring call volume and if call volume drops to a zero or near zero level, the monitor may automatically reset the radio frequency network elements at the subject cell site. It is contemplated that yet other specific triggering conditions and cell site data and/or alarm patterns can be monitored and used to trigger to near real-time monitoring and/or automated action.

Turning now to FIG. 1, a communication system 100 is described. In an embodiment, the system 100 comprises a radio access network (RAN) 102 comprising a plurality of cell sites 104. In some contexts the cell sites 104 may be referred to as base transceiver stations (BTSs) or cell towers. The RAN 102 may comprise further network elements such as Internet protocol (IP) routers, IP aggregators, home location registries (HLRs), visitor location registries (VLRs), session border controllers, policy and charging rules function (PCRF) servers. Alternatively, IP routers, IP aggregators, HLRs, VLRs, session border controllers, PCRF servers, and other network nodes may be conceptualized as part of a network 108. The network 108 comprises one or more private networks, one or more public networks, or a combination thereof. As one skilled in the art will appreciate, the cell site 104 comprises a variety of equipment items, equipment components, and equipment sub-components. The RAN 102 may provide a wireless communication link to a first user equipment (UE) 106 to complete a voice call to a second UE 107 or a data call (content download) to a web server 109. Part of the communication path in either the voice call or the data call may be provided by the network 108. The cell site 104 may provide wireless communication links to the UE 106 according to one or more of a long term evolution (LTE), a code division multiple access (CDMA), a global system for mobile communications (GSM), or a worldwide interoperability for microwave access (WiMAX) wireless communication protocol.

In an embodiment, the system 100 further comprises an inventory data platform 110 that collects data comprising metrics, settings, and configuration information from the RAN 102; processes that data; and stores the processed data in one more data stores represented in FIG. 1 as cell site data store 112. In an embodiment, the system 100 further comprises a server computer 114 that executes a network operations center (NOC) tool 116 that accesses the cell site data 112 and presents views of the cell site data 112 to NOC workstations 118. For example, the NOC tool 116 provides alarms, analysis tools, drill-down controls and views into the cell site data 112 to the NOC workstations 118. The server 114 also executes a real-time monitor application 120. In some contexts, the real-time monitor application 120 may be referred to as a real-time command and control process.

The UEs 106, 107 may be a mobile phone, a smart phone, a personal digital assistant (PDA), a media player, a headset computer, a wearable computer, a laptop computer, a notebook computer, or a tablet computer. The web server 109, the inventory data platform 110, the server 114, and the NOC workstations 118 may each be implemented as a computer system. Computer systems are described further hereinafter.

The flow through of data collected from the RAN 102, processed, and stored by the inventory data platform 110, and then presented on NOC workstations 118 by the mediation of the NOC tool 116 may result in a time lag before information is accessible for analysis and response by NOC operators. For example, some RAN data may be collected on 15 minute intervals while other RAN data may be collected on 1 hour intervals.

The present disclosure teaches the RT monitor application 120 observing the raw data collected from the RAN 102 by the inventory data platform 110 to identify triggering events or data values. This can be viewed as filtering a large stream of data for a small number of specific events or data parameters. Said in other words, the RT monitor application 120 may examine a selection or subset of all the raw data. This may be a small subset of the different parameter values included in the raw data, for example less than 5% of all different parameters, settings, or metrics collected from each cell site 104. When an event or data parameter is determined to meet a triggering criteria, the real-time monitor application 120 launches a thread or process that begins collecting data from the cell site 104 associated with the event or data parameter that satisfied the triggering criteria. This may be said to support real-time or near real-time monitoring of the cell site 104.

In general, processing resources do not permit performing such intensive near real-time monitoring of all cell sites in the RAN 102 (the RAN may comprise tens of thousands of cell sites, for example 60,000 cell sites). Here the strategy is to identify when conditions of a single cell site warrant heightened monitoring and only then commit processing resources to perform intensive monitoring of that one cell site rather than all the cell sites of the RAN 102. It is understood that a plurality of cell sites may be under intensive near real-time monitoring by the RT monitor application 120 at any given time, but this will be a small sub-set of the complete inventory of cell sites that make up the RAN 102. Different processing of the collected near real-time data of the selected cell site may be performed by the RT monitoring application 120 depending on the event or conditions that triggered the real-time data collection.

One of the triggering events that may be monitored by the real-time monitoring application 120 is a door open sensor active event. A wireless communication service provider has found that thieves sometimes break into the electronic equipment shelters located at their cell sites 104 and steal the expensive rechargeable batteries that are provided to continue wireless communication in the event of a local electrical service outage. When such a theft is in progress, action desirably is taken promptly or the thieves are gone with the batteries before they can be stopped. In a door open sensor event, the real-time monitoring application 120 may check on a maintenance schedule to see if the subject cell site has an on-location maintenance activity schedule for the present time. If no maintenance is scheduled for the cell site, the real-time monitoring application 120 may monitor a battery power voltage sensor and if the voltage drops to zero, present a high severity alarm on one or more displays of NOC workstations 118. In an embodiment, a cell site may comprise a plurality of batteries, and a first one of the batteries may be decoupled from the cell site power grid and lose sensed voltage before the one or more remaining batteries are disconnected. This may provide a response time window. The real-time monitoring application 120 may also automatically issue an alarm to local law enforcement to request police to promptly investigate a possible theft in progress at the cell site. If a maintenance activity is scheduled, the real-time monitoring application 120 may shut down any monitoring window or graphical user interface (GUI) it may have launched on a display of a NOC workstation 118. It is noted that a door open event may be falsely triggered, a battery alarm may be falsely triggered, but it is unlikely that both a door open event and a battery alarm would be falsely triggered at the same time when no maintenance is scheduled. By pairing these separate indications in this way the chances of a false alarm occurring may be substantially decreased.

Another of the triggering events may be an anomalous voltage standing wave ratio (VSWR) sensor value. This condition may prevent effective radio communications by the subject cell site. Waiting for poor performance to be detected by the NOC tool 116 may undesirably delay taking effective action. By triggering the real-time monitoring application 120 when this event occurs, the real-time monitoring application 120 can take prompt action to reset the cell site and possibly resolve the problem and improve the service of the cell site quickly. Resetting the cell site may comprise rebooting processors that the cell site is comprised of and power cycling power amplifiers and/or radio transceivers.

Another of the triggering events may be a smoke sensor active event. This condition may indicate a fire in the cell site 104. When triggered by a smoke sensor active event, the real-time monitoring application 120 may monitor an electronic equipment shelter temperature sensor value. If the temperature is observed to increase rapidly, the real-time monitoring application 120 may automatically warn that the cell site is experiencing a fire and dispatch emergency personnel to the site, such as local fire department personnel. Alternatively or in addition, the real-time monitoring application 120 may activate remote fire suppression systems located in the cell site (e.g., bottles charged with fire extinguishing powders, foam, or gas) and then take the cell site off line (e.g., open local electrical power distribution mains). While three examples of triggering events and/or parameter values have been described above, it is understood that other triggers are also contemplated by the present disclosure.

Figure 2:
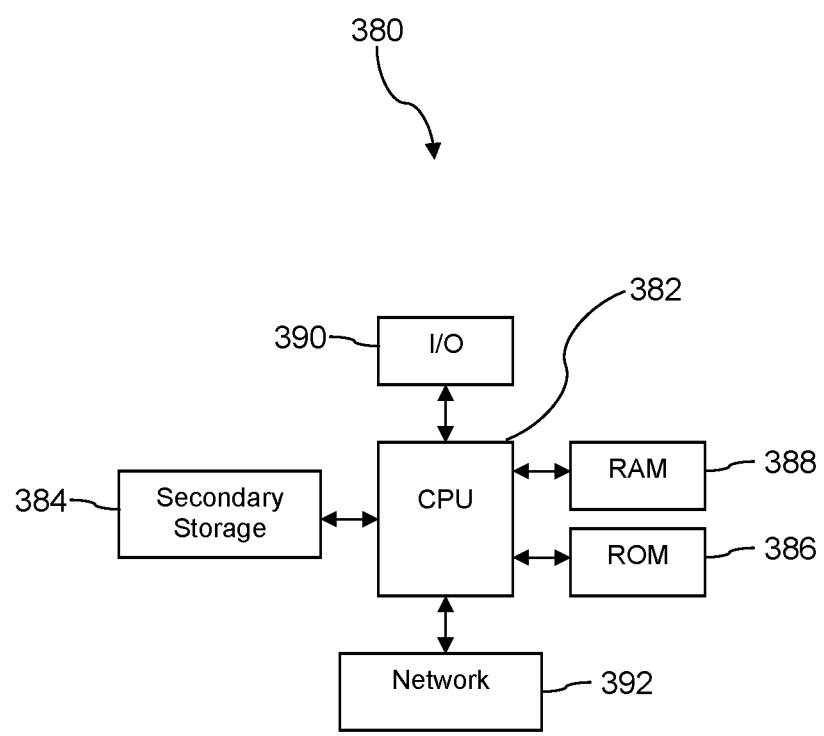
FIG. 2 is a block diagram of a computer system according to an embodiment of the disclosure.

FIG. 2 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile wireless communication network monitoring system, comprising:
   at least one processor;
   a non-transitory memory; and
   an application stored in the non-transitory memory that, when executed by the processor,
      examines a selection of data received from a plurality of cell sites, where the data comprises sensor values and performance metrics that are periodically pushed by the cell sites to the monitoring system and where the selection of data that is examined comprises an open door sensor value associated with a door and an electronic equipment shelter located at a cell site of the plurality of cell sites, and
      in response to determining that the open door sensor value is active for the cell site, initiates a real-time process that iteratively pulls data associated with the active open door sensor value from the cell site in near real-time instead of periodically and that presents the data pulled from the cell site associated with the active open door sensor value in a monitoring window of an operator workstation in a network operations center (NOC) of the mobile wireless communication network, wherein if there is no maintenance scheduled for the cell site, the real-time process analyzes a battery power voltage sensor value of the data pulled from the cell site associated with the active open door sensor value and sends an alarm message to at least one of law enforcement or the operator workstation in response to detecting that the battery power voltage sensor value is below a threshold voltage based on the analysis, whereby timely monitoring of the cell site is promoted.

2. The system of claim 1, wherein the selection of data examined from the plurality of cell sites comprises a subset of all data received from the plurality of cell sites.

3. The system of claim 2, wherein the selection of data examined from the plurality of cell sites comprises less than 5% of all data received from the plurality of cell sites.

4. The system of claim 1, wherein the real-time process checks a maintenance schedule for the cell site associated with the active open door sensor value.

5. The system of claim 4, wherein if there is maintenance scheduled for the cell site, the real-time process shuts the monitoring window it opened and then shuts down.

6. The system of claim 1, wherein the battery power voltage sensor value is zero.

7. The system of claim 1, wherein the cell sites are cell towers.

8. The system of claim 1, wherein the cell sites support at least one of a long term evolution (LTE), code division multiple access (CDMA), global system for mobile communications (GSM), or a worldwide interoperability for microwave access (WiMAX) wireless communication protocol.

9. The system of claim 1, wherein the application, when executed by the processor,
   examines another selection of data received from the plurality of cell sites, where the data from the another selection comprises sensor values and performance metrics that are periodically pushed by the cell sites to the monitoring system and where the another selection of data that is examined comprises a voltage standing wave ratio (VSWR) sensor value, and
   in response to determining that the VSWR sensor value is in alarm, initiates another real-time process that iteratively pulls data from the cell site associated with the alarmed VSWR sensor and that presents the data pulled from the cell site associated with the alarmed VSWR sensor in a monitoring window of the operator workstation in the NOC of the mobile wireless communication network.

10. The system of claim 9, wherein the another real-time process sends a reset command to radio equipment at the cell site associated with the alarmed VSWR sensor.

11. The system of claim 9, wherein the cell site associated with the alarmed VSWR sensor promotes wireless communication according to a long term evolution (LTE) wireless communication protocol.

12. The system of claim 9, wherein the cell site associated with the alarmed VSWR sensor promotes wireless communication according to a code division multiple access (CDMA) wireless communication protocol.

13. The system of claim 9, wherein the cell site associated with the alarmed VSWR sensor promotes wireless communication according to a global system for mobile communication (GSM) wireless communication protocol.

14. The system of claim 1, wherein the application, when executed by the processor,
   examines another selection of data received from the plurality of cell sites, where the data from the another selection comprises sensor values and performance metrics that are periodically pushed by the cell sites to the monitoring system and where the another selection of data that is examined comprises a smoke detector sensor value, and
   in response to determining that the smoke detector sensor value is active, initiates another real-time process that iteratively pulls data from the cell site associated with the active smoke detector value and that presents the data pulled from the cell site associated with the active smoke detector value in a monitoring window of the operator workstation in the NOC of the mobile wireless communication network.

15. The system of claim 14, wherein the another real-time process monitors an electronic equipment shelter temperature sensor value, detects an increase in temperature based on the monitoring, and sends a message to emergency personnel.

16. The system of claim 14, wherein the another real-time process monitors an electronic equipment shelter temperature sensor value, detects an increase in temperature based on the monitoring, and activates one or more remote fire suppression systems at the cell site associated with the active smoke detector value.

17. The system of claim 16, wherein the another real-time process further takes the cell site associated with the active smoke detector value off line.

* * * * *